(12) United States Patent
Matsumoto et al.

(10) Patent No.: US 12,553,218 B2
(45) Date of Patent: Feb. 17, 2026

(54) ACTIVATION SYSTEM FOR WORK MACHINE, ACTIVATION METHOD FOR WORK MACHINE, AND WORK MACHINE

(71) Applicant: KOMATSU LTD., Tokyo (JP)

(72) Inventors: Hayato Matsumoto, Tokyo (JP); Shunsuke Sugimura, Tokyo (JP); Takehiro Shibata, Tokyo (JP); Tomofumi Hokari, Tokyo (JP); Yuichiro Yasuda, Tokyo (JP); Kenji Nozaki, Tokyo (JP); Tomotaka Komatsu, Tokyo (JP); Yosuke Yamagoe, Tokyo (JP); Ryohei Kikuzawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 73 days.

(21) Appl. No.: 18/689,013

(22) PCT Filed: Sep. 28, 2022

(86) PCT No.: PCT/JP2022/036164
§ 371 (c)(1),
(2) Date: Mar. 4, 2024

(87) PCT Pub. No.: WO2023/054470
PCT Pub. Date: Apr. 6, 2023

(65) Prior Publication Data
US 2024/0368859 A1    Nov. 7, 2024

(30) Foreign Application Priority Data
Sep. 30, 2021    (JP) .................... 2021-161106

(51) Int. Cl.
*E02F 9/26* (2006.01)
*B60R 25/24* (2013.01)
*E02F 9/24* (2006.01)

(52) U.S. Cl.
CPC .............. *E02F 9/261* (2013.01); *B60R 25/24* (2013.01); *E02F 9/24* (2013.01); *B60R 2325/308* (2013.01)

(58) Field of Classification Search
CPC . E02F 9/261; E02F 9/24; E02F 9/2004; E02F 9/20; E02F 9/26; B60R 25/24; B60R 2325/308; H04N 7/18; B60Y 2200/412
See application file for complete search history.

(56) References Cited

U.S. PATENT DOCUMENTS

| 2009/0002489 A1 * | 1/2009 | Yang .................. G06V 10/7557 382/103 |
| 2020/0399863 A1 | 12/2020 | Aizawa et al. |
| 2022/0251803 A1 | 8/2022 | Ushijima et al. |

FOREIGN PATENT DOCUMENTS

| JP | 2008267944 A | * 11/2008 |
| JP | 2011203869 A | * 10/2011 |

(Continued)

OTHER PUBLICATIONS

JP 2008267944 A original and translation (Year: 2008).*

(Continued)

*Primary Examiner* — Frederick M Brushaber
(74) *Attorney, Agent, or Firm* — Spencer Fane LLP

(57) ABSTRACT

An activation system for a work machine includes a communication unit, a presentation unit, and a determination unit. The work machine includes a power source and an additional function unit that realizes a predetermined additional function. The communication unit receives confirmation history information indicating an operator who has confirmed a precaution related to the predetermined additional function from a server device. The a presentation unit presents the precaution. The determination unit determines (Continued)

whether or not to omit presentation of the precaution based on the confirmation history information.

18 Claims, 9 Drawing Sheets

(56) References Cited

FOREIGN PATENT DOCUMENTS

| | | | |
|---|---|---|---|
| JP | 2021-14736 A | 2/2021 | |
| WO | WO-2018180039 A1 * | 10/2018 | ....... G08B 13/19608 |
| WO | WO-2018180040 A1 * | 10/2018 | ............. H04N 7/188 |
| WO | 2019/172424 A1 | 9/2019 | |
| WO | 2021/010249 A1 | 1/2021 | |

OTHER PUBLICATIONS

JP 2011203869 A orignal and translation (Year: 2011).*
WO 2018180039 A1 original and translation (Year: 2018).*
WO 2018180040 A1 original and translation (Year: 2018).*

* cited by examiner

FIG. 7

D11 — OPERATOR AUTHENTICATION

PREVIOUSLY AUTHENTICATED OPERATOR
- XXX XXX

REGISTERED OPERATOR
- XXX XXX
- XXX XXX
- XXX XXX
- XXX XXX
- XXX XXX

D12 — OPERATION SETTING CONFIRMATION

P POWER    Hi
ID 123456    ID 123456
SLOW □ □ ■ FAST    ■ □ □ □ □

ISO/JIS

NO SETTING | NO SETTING
TRACK SAVE | PACKET ANGLE
HORN | BENCHMARK
STANDBY | GRADE
NO SETTING | LASER

IS ABOVE SETTING CONTENT OK? CHANGE?

CHANGE | OK

D13 — PRECAUTION CONFIRMATION SCREEN

⚠ WARNING

IF PERSON IS DETECTED DURING TRAVELING OR SWINGING ACTIVATION, DEPARTURE OF MACHINE IS CONTROLLED.
IF PERSON IS DETECTED WHILE TRAVELLING AT LOW SPEED, MACHINE WILL STOP.

✓ CONFIRMED

ACTIVATION SYSTEM FOR WORK MACHINE, ACTIVATION METHOD FOR WORK MACHINE, AND WORK MACHINE

CROSS-REFERENCE TO RELATED APPLICATIONS

This application is a U.S. National stage application of International Application No. PCT/JP2022/036164, filed on Sep. 28, 2022. This U.S. National stage application claims priority under 35 U.S.C. § 119(a) to Japanese Patent Application No. 2021-161106, filed in Japan on Sep. 30, 2021, the entire contents of which are hereby incorporated herein by reference.

BACKGROUND

Technical Field

The present disclosure relates to an activation system for a work machine, an activation method for a work machine, and a work machine.

Background Information

A technique is known which monitors the surroundings of a work machine and takes a predetermined safety measure in a case where an obstacle exists within a predetermined region so that the work machine does not come into contact with an obstacle including a person. Examples of the safety measure include an output of a warning by a buzzer or the like, and locking of the work machine (refer to, for example, Japanese Unexamined Patent Application, First Publication No. 2021-014736).

SUMMARY

It may be displayed that the work machine has an additional function such as the above-described safety function when the work machine is activated. On the other hand, as an operator who frequently boards work machines having similar functions, it may be bothersome to provide such a display each time the work machine is activated.

An object of the present disclosure is to provide an activation system for a work machine, an activation method for a work machine, and a work machine capable of, for an operator who has confirmed a precaution related to an additional function, omitting a display of the precaution.

According to an aspect of the present invention, there is provided an activation system for a work machine including a power source and an additional function unit that realizes a predetermined additional function, the activation system including: a communication unit configured to receive confirmation history information indicating an operator who has confirmed a precaution related to the additional function from a server device; a presentation unit that presents the precaution; and a determination unit that determines whether or not to omit presentation of the precaution based on the confirmation history information.

According to the above aspect, for an operator who has confirmed a precaution related to an additional function, it is possible to omit a display of the precaution.

BRIEF DESCRIPTION OF DRAWINGS

FIG. 7 is an example of a screen displayed on a touch panel according to the first embodiment.

DETAILED DESCRIPTION OF EMBODIMENT(S)

First Embodiment

Hereinafter, an embodiment will be described in detail with reference to the drawings.
(Configuration of Work Machine 100)

Figure 1:
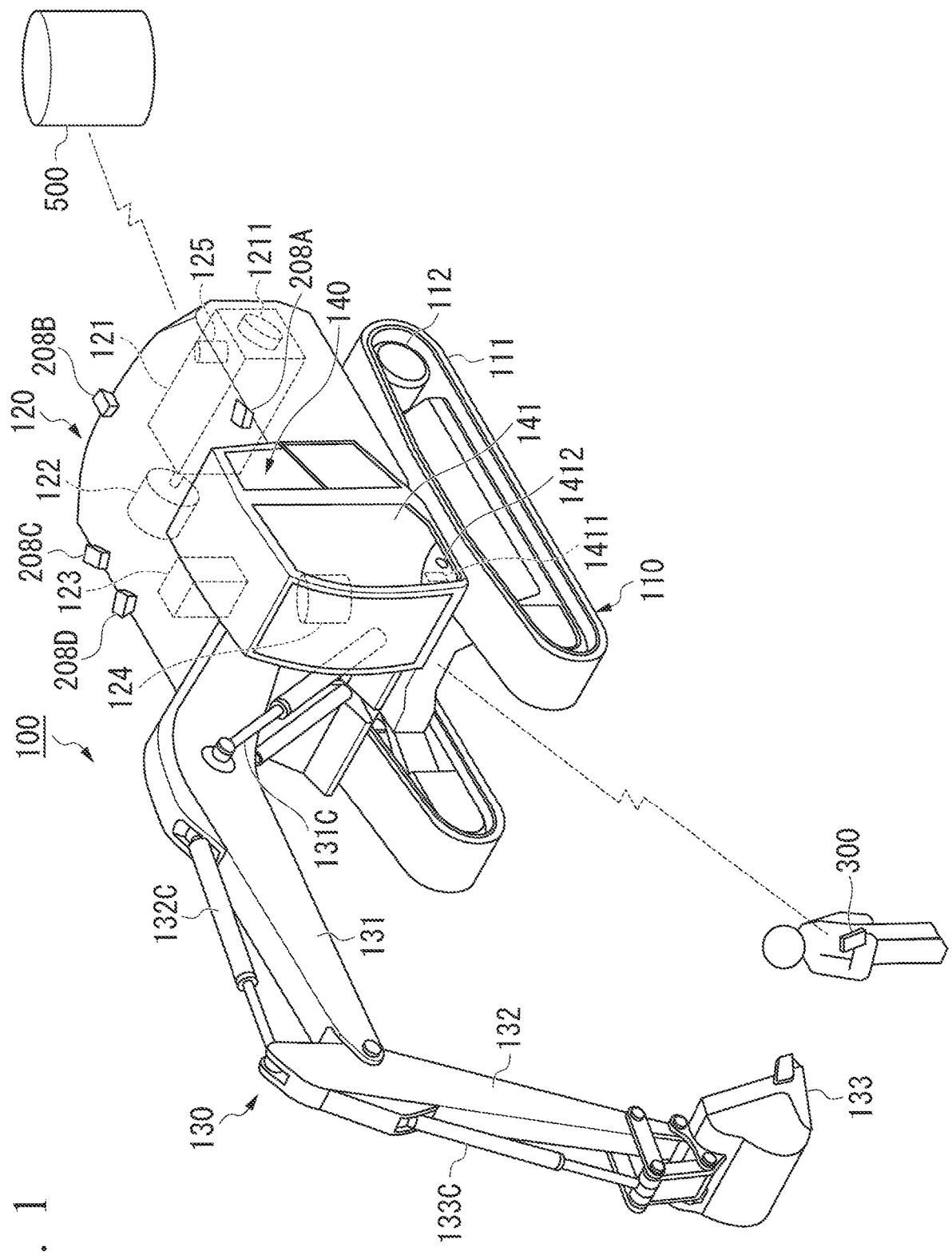
FIG. 1 is a schematic diagram showing a configuration of a work machine according to a first embodiment.

FIG. 1 is a schematic diagram showing a configuration of a work machine 100 according to a first embodiment.

The work machine 100 operates at a construction site and constructs a construction target such as earth. The work machine 100 according to the first embodiment is, for example, a hydraulic excavator. The work machine 100 includes an undercarriage 110, a swing body 120, work equipment 130, and a cab 140. The work machine 100 according to the first embodiment has, as a safety function, a collision prevention function that detects an obstacle in a periphery of the work machine 100 and limits operations of the undercarriage 110, the swing body 120, and the work equipment 130 based on a detection result.

The work machine 100 according to the first embodiment performs authentication of an operator by performing communication with an operator terminal 300 such as a smartphone owned by the operator using Bluetooth low energy (BLE) (Bluetooth is a registered trademark). Incidentally, in another embodiment, the work machine 100 and the operator terminal 300 may perform communication by a short-range wireless communication method other than BLE, such as Bluetooth (registered trademark) or Zigbee (registered trademark). In addition, the work machine 100 receives master data and confirmation history data used for the authentication of the operator from a remote server device 500 via wide area communication such as the Internet. Accordingly, the work machine 100 can perform an authentication process using the latest master data even if the available operator is changed.

The master data stored in the server device 500 is data in which an operator ID, a password, a display name, information indicating an operation authority for the work machine 100, operation setting data, and a device address of Bluetooth (registered trademark) are associated with each other for each operator. The operation setting data is used when controlling a hydraulic circuit. By using the information indicating the operation authority, it is possible to identify whether or not an operator has the operation authority for the work machine 100, and contents that can be set on a monitor. In addition, the operation setting data indicates a relationship between an operation amount and a control amount. The operation setting data may be, for example, a weight value with respect to the control amount or a function indicating the relationship between the operation amount and the control amount.

The confirmation history data stored in the server device 500 indicates an operator ID of an operator who has confirmed a precaution regarding an additional function of the work machine 100.

The undercarriage 110 supports the work machine 100 so that the work machine 100 can travel. The undercarriage 110 includes two endless tracks 111 provided on left and right sides and two traveling motors 112 for respectively driving the endless tracks 111.

The swing body 120 is supported by the undercarriage 110 to be swingable around a swing center.

The work equipment 130 is driven by hydraulic pressure. The work equipment 130 is supported by a front portion of the swing body 120 so that the work equipment 130 can be driven in an up-down direction. The cab 140 is a space in which the operator boards and operates the work machine 100. The cab 140 is provided on a left front portion of the swing body 120.

Here, a portion of the swing body 120 to which the work equipment 130 is attached is referred to as a front portion. In addition, in the swing body 120, a portion on an opposite side, a portion on a left side, and a portion on a right side with respect to the front portion are referred to as a rear portion, a left portion, and a right portion.

(Configuration of Swing Body 120)

The swing body 120 includes an engine 121, a hydraulic pump 122, a control valve 123, a swing motor 124, and a fuel injection device 125.

The engine 121 is a prime mover that drives the hydraulic pump 122. A cell motor 1211 is provided in the engine 121. The engine 121 is activated by rotation of the cell motor 1211.

The hydraulic pump 122 is a variable capacity pump driven by the engine 121. The hydraulic pump 122 supplies hydraulic oil to each actuator (a boom cylinder 131C, an arm cylinder 132C, a bucket cylinder 133C, the traveling motor 112, and the swing motor 124) via the control valve 123.

The control valve 123 controls a flow rate of the hydraulic oil supplied from the hydraulic pump 122.

The swing motor 124 is driven by the hydraulic oil supplied from the hydraulic pump 122 via the control valve 123 to swing the swing body 120.

The fuel injection device 125 injects fuel into the engine 121.

Figure 2:
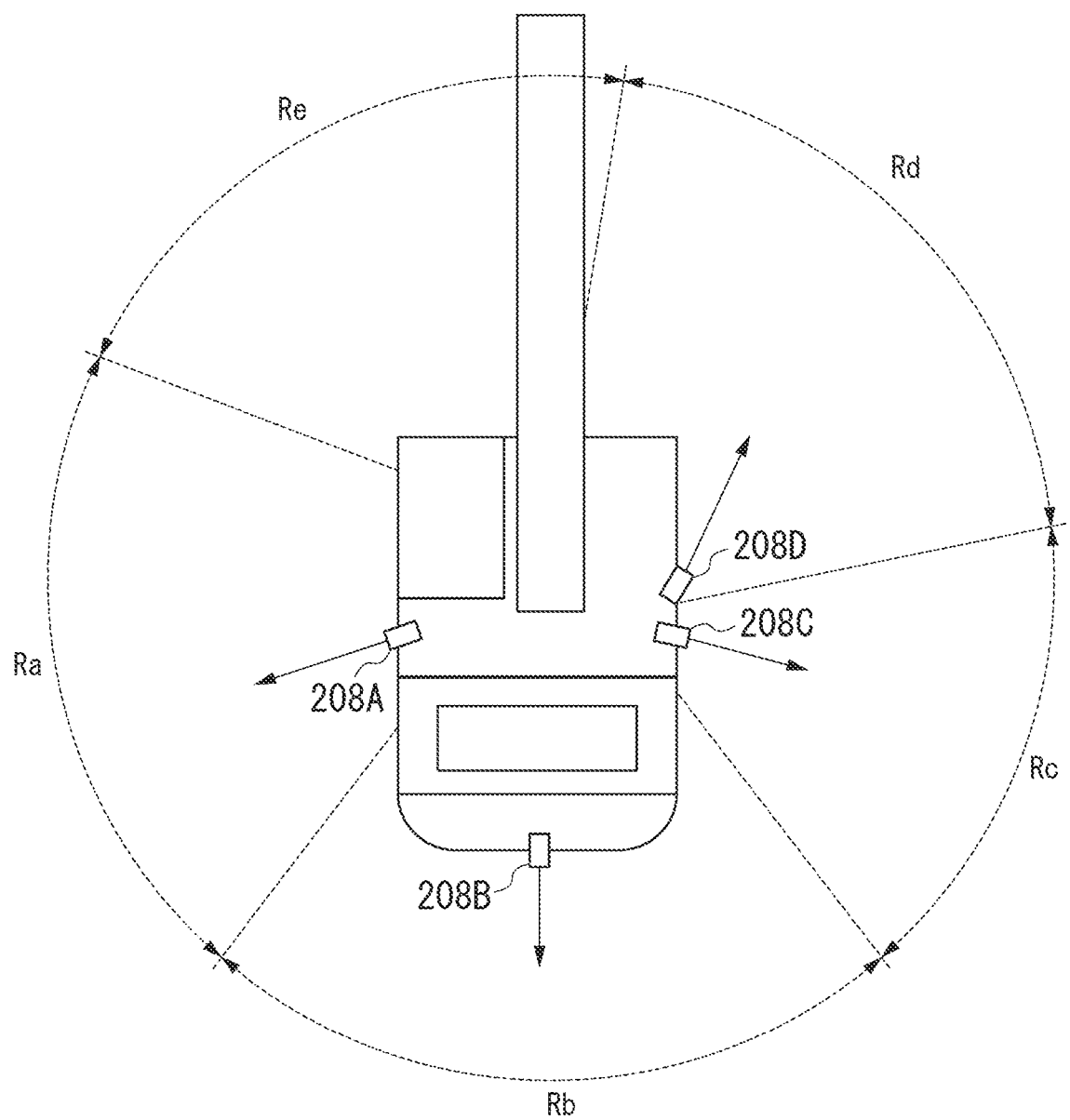
FIG. 2 is a diagram showing imaging ranges of a plurality of cameras provided in the work machine according to the first embodiment.

The swing body 120 is provided with a plurality of cameras 208 that capture images of surroundings of the work machine 100. FIG. 2 is a diagram showing imaging ranges of the plurality of cameras 208 provided in the work machine 100 according to the first embodiment.

Specifically, the swing body 120 is provided with a left rear camera 208A that captures an image of a left rear region Ra of the surroundings of the swing body 120, a rear camera 208B that captures an image of a rear region Rb of the surroundings of the swing body 120, a right rear camera 208C that captures an image of a right rear region Rc of the surroundings of the swing body 120, and a right front camera 208D that captures an image of a right front region Rd of the surroundings of the swing body 120. Here, the imaging ranges of the plurality of cameras 208 may partially overlap.

The imaging ranges of the plurality of cameras 208 cover a range of an entire periphery of the work machine 100 excluding a left front region Re that can be visually recognized from the cab 140. Here, the cameras 208 according to the first embodiment capture images of regions on left rear, rear, right rear, and right front sides of the swing body 120, but are not limited thereto in another embodiment. For example, the number of the cameras 208 and the imaging ranges according to another embodiment may differ from the example shown in FIGS. 1 and 2.

(Configuration of Work Equipment 130)

The work equipment 130 includes a boom 131, an arm 132, a bucket 133, the boom cylinder 131C, the arm cylinder 132C, and the bucket cylinder 133C.

A proximal end portion of the boom 131 is attached to the swing body 120 via a boom pin.

The arm 132 connects the boom 131 and the bucket 133. A proximal end portion of the arm 132 is attached to a distal end portion of the boom 131 via an arm pin.

The bucket 133 includes an edge for excavating earth and the like, and an accommodating portion that accommodates the excavated earth. A proximal end portion of the bucket 133 is attached to a distal end portion of the arm 132 via a bucket pin.

The boom cylinder 131C is a hydraulic cylinder for operating the boom 131. A proximal end portion of the boom cylinder 131C is attached to the swing body 120. A distal end portion of the boom cylinder 131C is attached to the boom 131.

The arm cylinder 132C is a hydraulic cylinder for driving the arm 132. A proximal end portion of the arm cylinder 132C is attached to the boom 131. A distal end portion of the arm cylinder 132C is attached to the arm 132.

The bucket cylinder 133C is a hydraulic cylinder for driving the bucket 133. A proximal end portion of the bucket cylinder 133C is attached to the arm 132. A distal end portion of the bucket cylinder 133C is attached to a link member connected to the bucket 133.

(Configuration of Cab 140)

A left surface of the cab 140 is provided with a door 141 for the operator to board. The door 141 is provided with a lock actuator 1411 for locking the door 141 and a door switch 1412 for unlocking the door 141.

Figure 3:
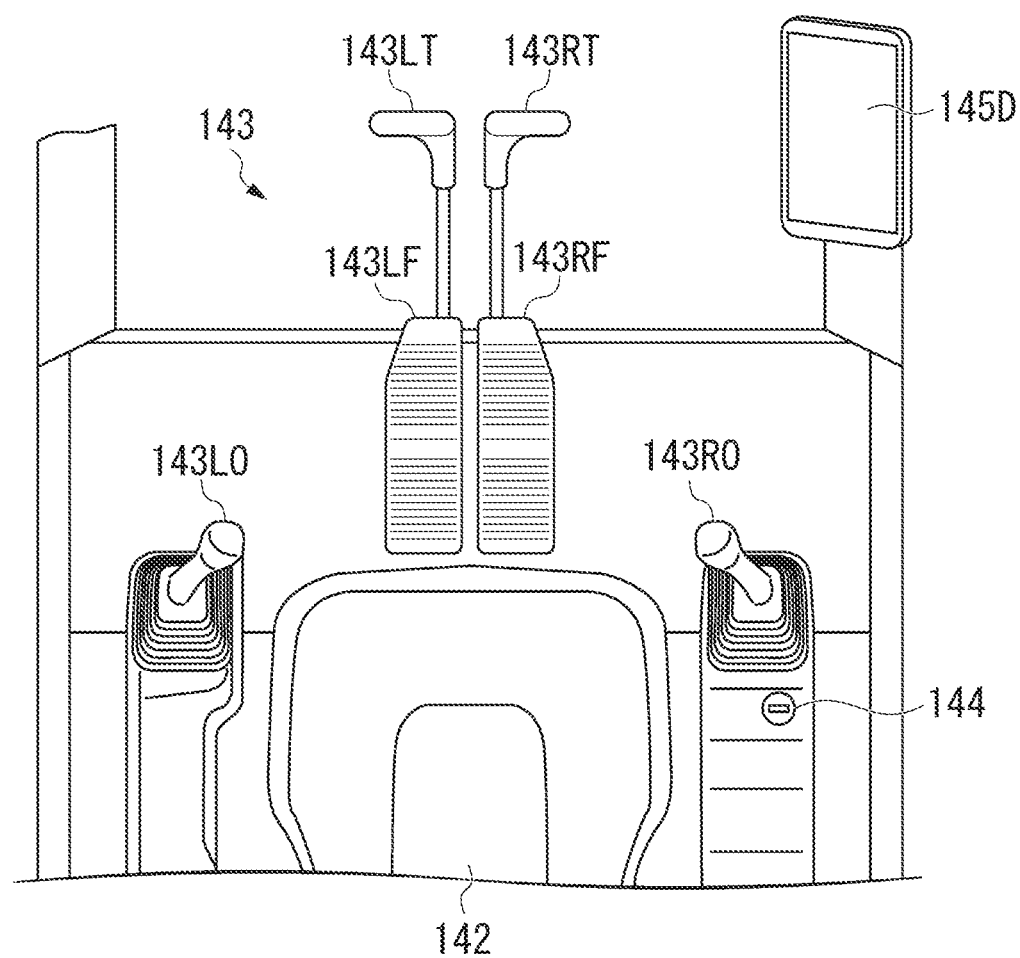
FIG. 3 is a diagram showing an internal configuration of a cab according to the first embodiment.

FIG. 3 is a diagram showing an internal configuration of the cab 140 according to the first embodiment.

In the cab 140, a driver seat 142, an operation device 143, a rotary switch 144, and a touch panel 145D are provided. The rotary switch 144 is a switch that takes four positions: OFF, ACC (accessory), IG (ignition), and ST (start) when rotated. When a finger is released from the rotary switch 144 at the ST position, the rotary switch 144 automatically returns to the IG position by a spring mechanism (not shown). The rotary switch 144 is an example of a starting switch for driving an engine controller 206.

The operation device 143 is a device for driving the undercarriage 110, the swing body 120, and the work equipment 130 by a manual operation of the operator. The operation device 143 includes a left operation lever 143LO, a right operation lever 143RO, a left foot pedal 143LF, a right foot pedal 143RF, a left traveling lever 143LT, and a right traveling lever 143RT.

The left operation lever 143LO is provided on a left side of the driver seat 142. The right operation lever 143RO is provided on a right side of the driver seat 142.

The left foot pedal 143LF is disposed on a left portion of a floor surface in front of the driver seat 142. The right foot pedal 143RF is disposed on a right portion of the floor surface in front of the driver seat 142. The left traveling lever 143LT is pivotally supported by the left foot pedal 143LF, and is configured such that inclination of the left traveling lever 143LT and pressing down of the left foot pedal 143LF are linked to each other. The right traveling lever 143RT is pivotally supported by the right foot pedal 143RF, and is configured such that inclination of the right traveling lever 143RT and pressing down of the right foot pedal 143RF are linked to each other.

The left foot pedal 143LF and the left traveling lever 143LT correspond to rotational drive of a left track shoe of the undercarriage 110. Specifically, when the operator of the work machine 100 tilts the left foot pedal 143LF or the left traveling lever 143LT forward, the left track shoe rotates in a forward movement direction. In addition, when the operator of the work machine 100 tilts the left foot pedal 143LF or the left traveling lever 143LT rearward, the left track shoe rotates in a backward movement direction.

The right foot pedal 143RF and the right traveling lever 143RT correspond to rotational drive of a right track shoe of the undercarriage 110. Specifically, when the operator of the work machine 100 tilts the right foot pedal 143RF or the right traveling lever 143RT forward, the right track shoe rotates in the forward movement direction. In addition, when the operator of the work machine 100 tilts the right foot pedal 143RF or the right traveling lever 143RT rearward, the right track shoe rotates in the backward movement direction.

The left operation lever 143LO and the right operation lever 143RO are operation mechanisms for the swing body 120 to perform a swinging operation, for the boom 131 to perform a raising or lowering operation, for the arm 132 to perform an excavating or dumping operation, and for the bucket 133 to perform an excavating or dumping operation. In the work machine 100 according to the first embodiment, an operation pattern of each operation lever is individually set for each operator. Examples of the operation pattern include the following patterns.

When the left operation lever 143LO is tilted forward, the dumping operation of the arm 132 is performed. When the left operation lever 143LO is tilted rearward, the excavating operation of the arm 132 is performed. When the left operation lever 143LO is tilted in a rightward direction, the swing body 120 swings rightward. When the left operation lever 143LO is tilted in a leftward direction, the swing body 120 swings leftward. When the right operation lever 143RO is tilted forward, the lowering operation of the boom 131 is performed. When the right operation lever 143RO is tilted rearward, the raising operation of the boom 131 is performed. When the right operation lever 143RO is tilted in the rightward direction, the dumping operation of the bucket 133 is performed. When the right operation lever 143RO is tilted in the leftward direction, the excavating operation of the bucket 133 is performed.

(Configuration of Control System 145)

Figure 4:
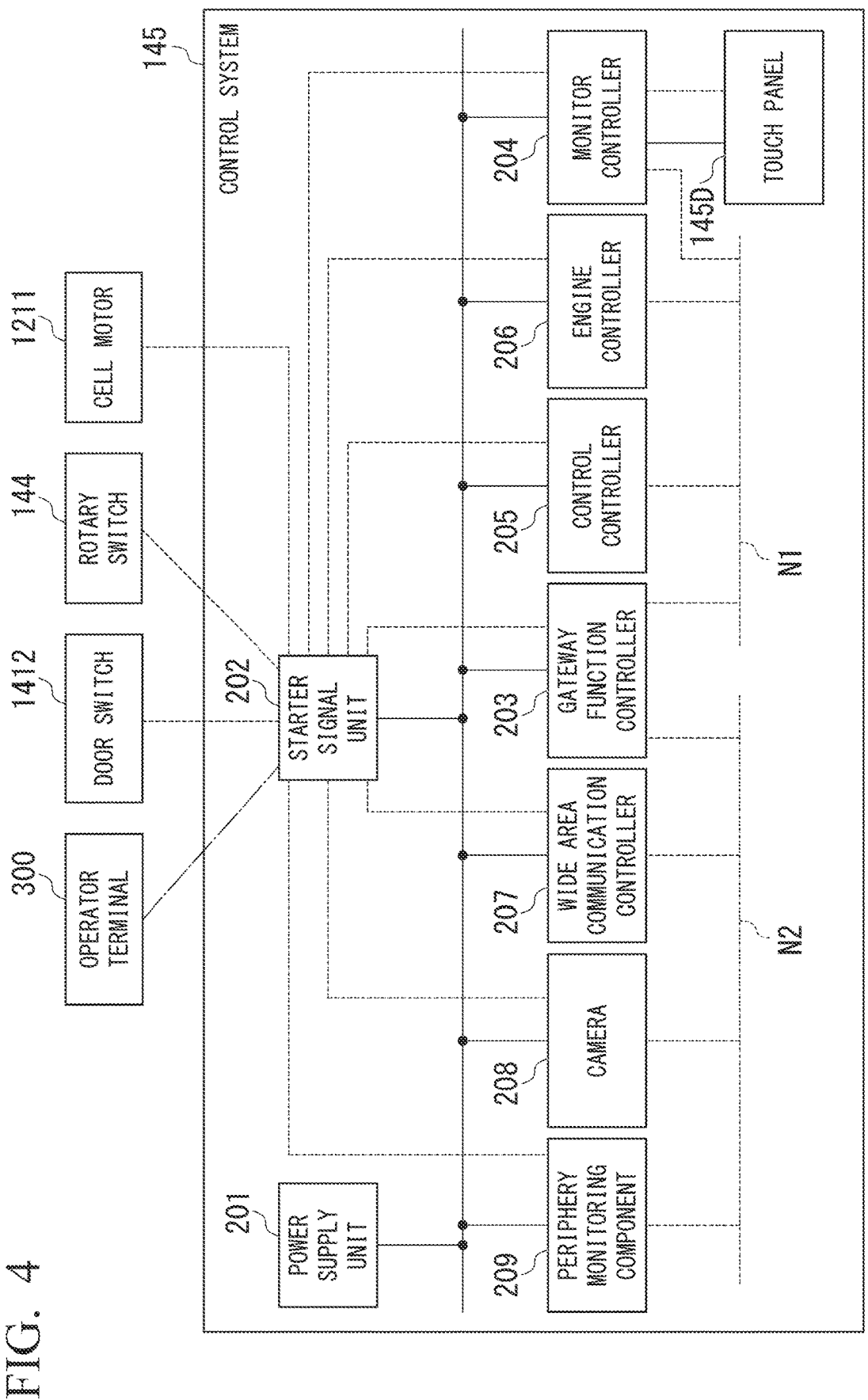
FIG. 4 is a schematic block diagram showing a hardware configuration of a control system according to the first embodiment.

FIG. 4 is a schematic block diagram showing a hardware configuration of a control system 145 according to the first embodiment. In FIG. 4, solid lines indicate power lines, and dashed lines indicate signal lines. In addition, in FIG. 4, dot-dashed lines indicate wireless communication.

The control system 145 includes a power supply unit 201, a starter signal unit 202, a gateway function controller 203, a monitor controller 204, a control controller 205, the engine controller 206, a wide area communication controller 207, the camera 208, and a periphery monitoring component 209.

The starter signal unit 202, the gateway function controller 203, the monitor controller 204, the control controller 205, and the engine controller 206 are connected to each other via a first internal network N1 of the work machine 100, such as a controller area network (CAN). In addition, the gateway function controller 203, the wide area communication controller 207, the camera 208, and the periphery monitoring component 209 are connected to each other via a second internal network N2 of the work machine 100, such as Ethernet (registered trademark).

The power supply unit 201 supplies electric energy to each device constituting the control system 145.

The starter signal unit 202 receives, as inputs, signals from the door switch 1412, the rotary switch 144, the operator terminal 300, and the monitor controller 204. The starter signal unit 202 outputs an activation signal or a drive signal to the gateway function controller 203, the monitor controller 204, the control controller 205, the engine controller 206, the wide area communication controller 207, the camera 208, the periphery monitoring component 209, the lock actuator 1411, or the cell motor 1211 based on the input signals. A controller to which the activation signal is input is activated and operated by the electric energy supplied by the power supply unit 201. The starter signal unit 202 always operates by receiving the electric energy supplied from the power supply unit 201 even when other controllers are in a stopped state. On the other hand, the starter signal unit 202 may be configured such that, when the work machine 100 is not activated, only a circuit having a BLE communication function is in an activation state, and other configurations are in a dormant state or are intermittently activated.

The gateway function controller 203 relays communication between controllers connected to the first internal network N1 and controllers connected to the second internal network N2. In particular, the gateway function controller 203 stores the master data regarding the authentication of the operator received by the wide area communication controller 207 from the server device 500 via a wide area communication network, and transmits the stored data to a component connected via the first internal network N1.

The monitor controller 204 controls a display on the touch panel 145D included in the control system 145, and notifies of the occurrence of a touch operation of the touch panel 145D. The control system 145 according to another embodiment may include a monitor that does not have a touch input function, such as a liquid crystal display (LCD), and a physical button, instead of the touch panel 145D. In this case, the monitor controller 204 controls a display on the monitor and notifies of the pressing of the physical button.

The control controller 205 acquires various data related to a hydraulic device that controls an operation of the work equipment 130 via a sensor (not shown), and outputs a control signal for controlling the hydraulic device according to an operation of the operation device 143. That is, the control controller 205 controls the drive of the boom cylinder 131C, the arm cylinder 132C, the bucket cylinder 133C, the traveling motor 112, the swing motor 124, or the like. The control controller 205 is an example of a work equipment control device that controls an actuator that drives the work equipment 130.

The engine controller 206 controls the engine 121 by acquiring various data related to the engine 121 via a sensor (not shown) and instructing the fuel injection device 125 on a fuel injection amount. The engine controller 206 is an example of a power source control unit that controls a power source.

The wide area communication controller 207 has a function of performing communication via the wide area communication network. The wide area communication controller 207 receives the master data and the confirmation history data received from the server device 500, by communication via the wide area communication network. The wide area communication controller 207 is intermittently activated in a predetermined cycle (for example, a 24-hour cycle) to receive data from the server device 500. The wide area communication controller 207 may receive data through periodic push transmissions from the server device 500, or may transmit a data request to the server device 500 at any timing to receive data in response.

As shown in FIG. 2, the camera 208 captures an image of the surroundings of the work machine 100.

The periphery monitoring component 209 generates an overhead image based on the images captured by the cameras 208, and displays the overhead image on the touch panel 145D via the monitor controller 204. In addition, the periphery monitoring component 209 detects an obstacle existing within a predetermined distance from the work machine 100. That is, the periphery monitoring component 209 is an example of an additional function unit that realizes a predetermined additional function.

The control system 145 has a function of performing log-in processing of an operator boarding the cab 140 by the operation of the touch panel 145D. For example, the control system 145 may include a controller that performs the log-in processing, or the starter signal unit 202, the gateway function controller 203, and the monitor controller 204 may have a function of performing the log-in processing. Specifically, the control system 145 displays an operator ID selection screen on the touch panel 145D via the monitor controller 204, and receives a selection of the operator ID. When the selected operator ID indicates an operator who is in close proximity to the work machine 100 and has an operation authority, the control system 145 authenticates that the operator boarding the cab 140 is an operator having the operation authority.

(Operator Terminal 300)

The operator terminal 300 functions as a peripheral equipment of BLE by executing an activation program of the work machine 100 installed in advance. When the activation program is executed, the operator terminal 300 displays a list of the work machines 100 and receives a selection of the work machine 100 to be activated from the operator. When the operator terminal 300 receives the selection of the work machine 100, the operator terminal 300 starts transmitting an advertising packet including a device address of the operator terminal 300 and a machine ID of the selected work machine 100.

(Operation of Control System 145)

Figure 5:
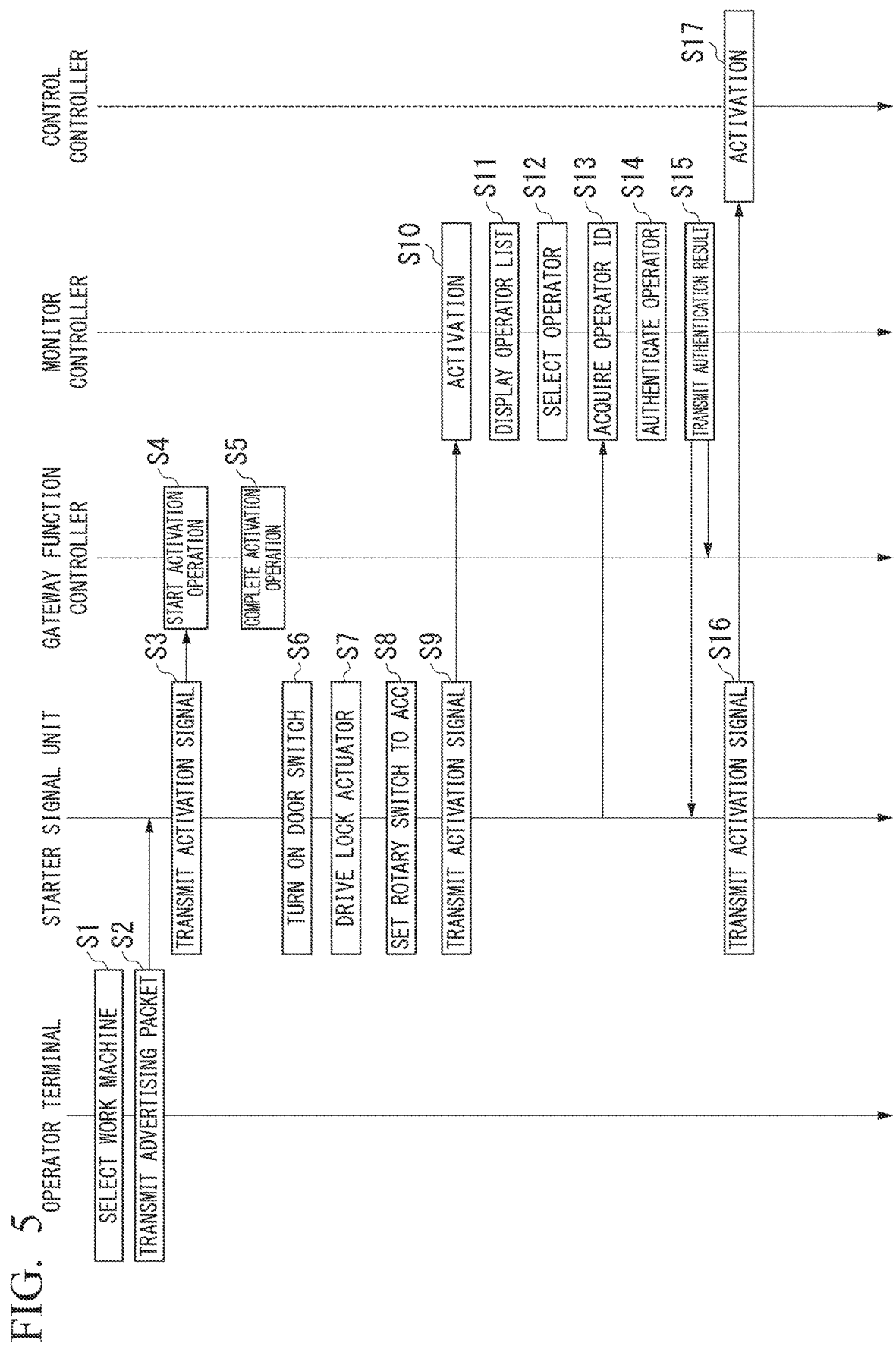
FIG. 5 is a sequence diagram (part 1) showing an example of an activation operation of the work machine by the control system in the first embodiment.
Figure 6:
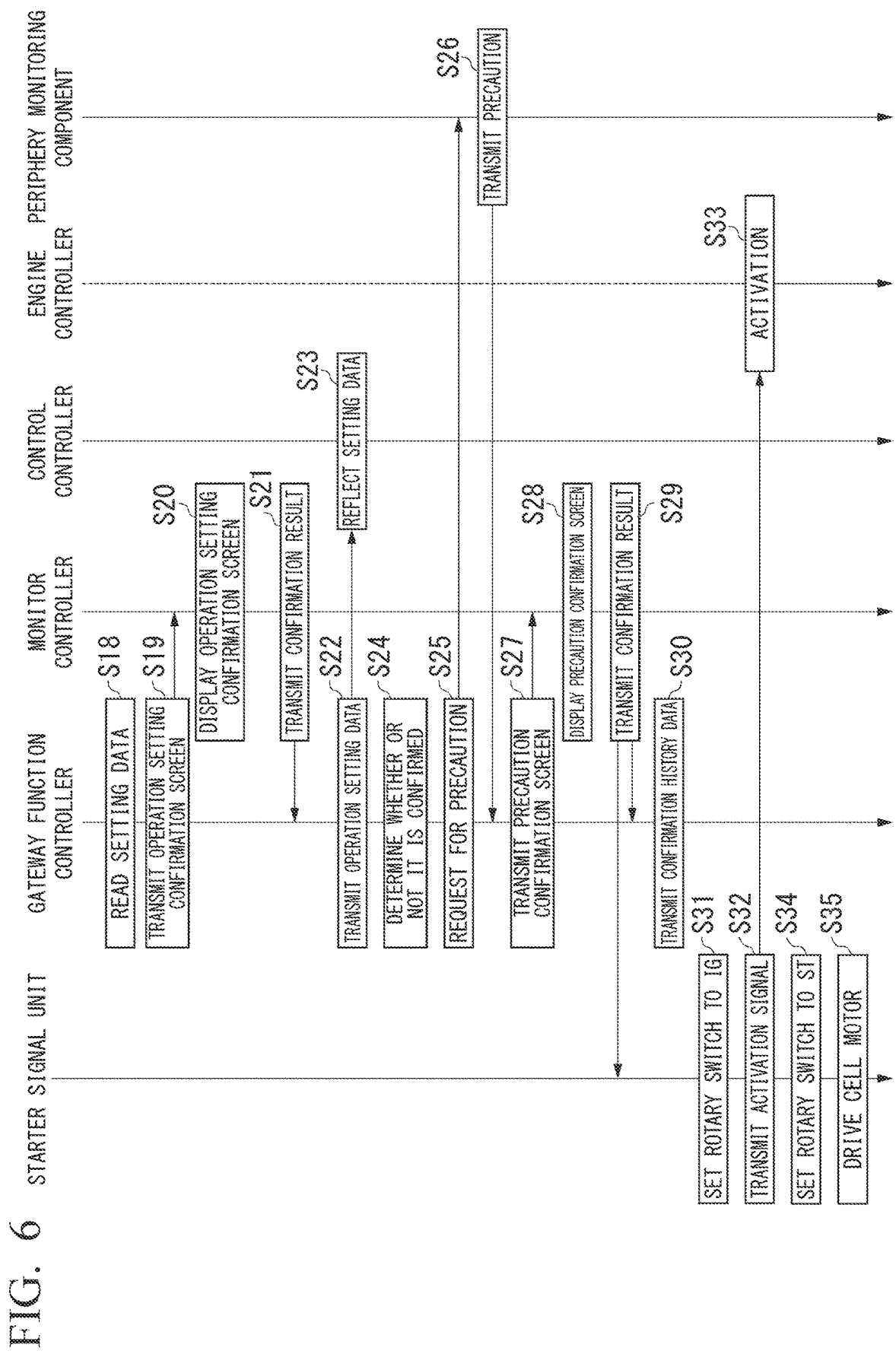
FIG. 6 is a sequence diagram (part 2) showing the example of the activation operation of the work machine by the control system in the first embodiment.

Here, an activation operation of the work machine 100 when an operator (specific operator) who has the operation authority for the work machine 100 boards the work machine 100 will be described. The control system 145 is an example of an activation system for the work machine 100. FIG. 5 is a sequence diagram (part 1) showing an example of the activation operation of the work machine 100 by the control system 145 in the first embodiment. FIG. 6 is a sequence diagram (part 2) showing the example of the activation operation of the work machine 100 by the control system 145 in the first embodiment. FIG. 7 is an example of a screen displayed on the touch panel 145D according to the first embodiment. Before executing the following process, the gateway function controller 203 periodically receives the master data and the confirmation history data from the server device 500 via the wide area communication controller 207, and stores the latest data.

When the operator operates the operator terminal 300 and executes the activation program, a list of the work machines 100 is displayed, and a selection of the work machine 100 to be activated from the operator is received (step S1). When the selection of the work machine 100 is received, the operator terminal 300 transmits the advertising packet including the device address and the machine ID of the selected work machine 100 (step S2).

The starter signal unit 202 receives the advertising packet and determines that the specific operator is in close proximity in a case where the operator terminal 300 which is a transmission source of the advertising packet is paired. When the starter signal unit 202 determines that the specific operator is in close proximity, the starter signal unit 202 transmits an activation signal to the gateway function controller 203 (step S3). Accordingly, the gateway function controller 203 starts an activation operation (step S4). Subsequently, the gateway function controller 203 completes the activation operation (step S5).

When the operator reaches the work machine 100, the operator presses the door switch 1412 to open the door 141. Accordingly, the starter signal unit 202 receives a signal indicating ON from the door switch 1412 (step S6). After confirming a state of close proximity of the specific operator, the starter signal unit 202 drives the lock actuator 1411 and unlocks the door 141 (step S7).

When the operator boards the cab 140 and sets the rotary switch 144 to the ACC position, the starter signal unit 202 receives a signal indicating ACC from the rotary switch 144 (step S8). After confirming the state of close proximity of the specific operator, the starter signal unit 202 drives the lock actuator 1411 and unlocks the door 141. After confirming the state of close proximity of the specific operator, the starter signal unit 202 transmits the activation signal to the monitor controller 204 (step S9). Accordingly, the monitor controller 204 is activated (step S10).

The monitor controller 204 outputs a signal for displaying an operator list screen D11 shown in FIG. 7 to the touch panel 145D (step S11). Accordingly, the monitor controller 204 displays the operator list screen D11 on the touch panel 145D. In a case where the rotary switch 144 is in the ACC position, the engine 121 is not being activated. That is, the starter signal unit 202 displays the operator list screen D11 while the engine 121 is stopped. The monitor controller 204 receives a selection of one operator ID from the operator list screen D11 by an operation of the operator (step S12). The monitor controller 204 receives, from the starter signal unit 202 via the second internal network N2, information regarding the operator terminal 300 connected in step S2, and acquires the operator ID associated with the operator terminal 300 from the gateway function controller 203 (step S13). The monitor controller 204 collates the operator ID selected in step S12 with the operator ID acquired in step S13 and performs authentication of the operator (step S14). That is, the monitor controller 204 is an example of an authentication unit that authenticates the operator who operates the work machine 100. In another embodiment, the monitor controller 204 may transmit the selected operator ID to the gateway function controller 203, and the gateway function controller 203 may perform authentication of the operator. In a case where the operator can be authenticated, the monitor controller 204 outputs an authentication result via the first internal network N1 (step S15).

In a case where the operator authentication fails, the monitor controller 204 returns the process to reception of selection of the operator ID in step S12.

When acquiring the authentication result via the first internal network N1, the starter signal unit 202 transmits the activation signal to the control controller 205, the wide area communication controller 207, the camera 208, and the periphery monitoring component 209 (step S16). That is, the starter signal unit 202 transmits the activation signal to the components that have not been activated, other than the engine controller 206. Accordingly, the control controller 205, the wide area communication controller 207, the camera 208, and the periphery monitoring component 209 are activated (step S17). In another embodiment, the starter signal unit 202 may activate the control controller 205, the wide area communication controller 207, the camera 208, and the periphery monitoring component 209 at the same timing as step S9 of the monitor controller 204.

On the other hand, when the gateway function controller 203 receives the authentication result output in the step S15, the gateway function controller 203 reads the operation setting data associated with the selected operator ID from the stored master data (step S18). The gateway function controller 203 generates an operation setting confirmation screen D12 for confirming an operation setting content as shown in FIG. 7 based on the read operation setting data, and transmits a display instruction for the operation setting confirmation screen D12 to the monitor controller 204 (step S19). When receiving the display instruction, the monitor controller 204 displays the operation setting confirmation screen D12 on the touch panel 145D (step S20). The operation setting confirmation screen D12 includes information for confirming a speed of the work equipment 130 with respect to an operation amount of the operation lever, a correspondence relationship between an operation direction of the operation lever and each part of the work equipment 130, a function assigned to a button (not shown) provided on the operation lever, and the like. On the operation setting confirmation screen D12, a change button for changing the setting content and an OK button for not changing the content are displayed.

When the operator presses the OK button, the monitor controller 204 transmits information indicating that the operation setting data is not changed to the gateway function controller 203 via the first internal network N1 as a confirmation result of the operation setting confirmation screen D12 (step S21). In a case where the operator presses the change button, the monitor controller 204 receives, as an input, a changed content of the operation setting from the operator, and transmits changed operation setting data to the gateway function controller 203 via the first internal network N1 as a confirmation result of the operation setting confirmation screen D12. In this case, the gateway function controller 203 updates the stored operation setting data.

When acquiring the confirmation result of the operation setting confirmation screen D12 from the monitor controller 204, the gateway function controller 203 transmits the operation setting data to the control controller 205 (step S22). Accordingly, the control controller 205 reflects the operation setting data (step S23).

The gateway function controller 203 determines whether or not the operator ID indicated by the authentication result received from the monitor controller 204 in step S15 is included in the confirmation history data received from the server device 500 in advance (step S24). The gateway function controller 203 is an example of a determination unit that determines whether or not to omit presentation of a precaution based on confirmation history information. In a case where the authenticated operator ID is not included in the confirmation history data, that is, in a case where the authenticated operator has not confirmed the precaution related to the additional function in the past, the gateway function controller 203 transmits a request for the precaution to the component connected via the second internal network N2 (step S25). Each component connected via the second internal network N2 determines whether or not there is a precaution to be confirmed by the operator before starting the engine 121, and, in a case where there is a precaution, transmits information indicating the precaution to the gateway function controller 203 (step S26). In the control system 145 according to the first embodiment, since a precaution is set in the periphery monitoring component 209, the periphery monitoring component 209 transmits information indicating the precaution to the gateway function controller 203 via the second internal network N2.

When receiving the information indicating the precaution, the gateway function controller 203 generates a precaution confirmation screen D13 for confirming the precaution as shown in FIG. 7, and transmits a display instruction for the precaution confirmation screen D13 to the monitor controller 204 (step S27). When receiving the display instruction, the monitor controller 204 displays the precaution setting confirmation screen D13 on the touch panel 145D (step S28). The precaution confirmation screen D13 includes the precaution for using the periphery monitoring component 209. Specifically, it is described on the precaution confirmation screen D13 that an operation of the work machine 100 may be limited by the periphery monitoring component 209. On the precaution confirmation screen D13, a confirm button for indicating an intention that the content has been confirmed is displayed. That is, the monitor controller 204 is an example of a presentation unit that presents a precaution related to an additional function.

When the operator presses the confirm button, the monitor controller 204 transmits information indicating that the precaution confirmation screen D13 is confirmed via the first internal network N1 (step S29). Accordingly, the starter signal unit 202 can recognize that the precaution is confirmed by the operator. When receiving the information indicating that the precaution confirmation screen D13 is confirmed from the monitor controller 204, the gateway function controller 203 generates confirmation history data indicating that the operator indicated by the operator ID received in step S15 has confirmed the precaution. The gateway function controller 203 transmits the generated confirmation history data to the server device 500 via the wide area communication controller 207 (step S30).

In a case where the authenticated operator ID is included in the confirmation history data in step S24, that is, in a case where the authenticated operator has confirmed the precaution related to the additional function in the past, the gateway function controller 203 does not perform the transmission of the request for the precaution in step S25, and does not perform the generation of the precaution confirmation screen D13 and the transmission of the display instruction in step S27. Instead, the gateway function controller 203 transmits the information indicating that the precaution confirmation screen D13 has already been confirmed via the first internal network N1. Accordingly, the gateway function controller 203 can omit the display of the precaution confirmation screen D13.

When the operator sets the rotary switch 144 to the IG position after the precaution is confirmed or after the precaution is omitted, the starter signal unit 202 receives a signal indicating IG from the rotary switch 144 (step S31). The starter signal unit 202 transmits the activation signal to the engine controller 206 (step S32). Accordingly, the engine controller 206 is activated (step S33).

When the operator sets the rotary switch 144 to the ST position, the starter signal unit 202 receives a signal indicating ST from the rotary switch 144 (step S34). The starter signal unit 202 drives the cell motor 1211 (step S35). Accordingly, the engine 121 is started, and the work machine 100 enters an operable state.

In the sequence diagrams shown in FIGS. 5 and 6, when the authentication is performed by the monitor controller 204 in step S15, the control controller 205 is activated in step S17, but the present disclosure is not limited thereto. For example, in another embodiment, the control controller 205 may be activated after the precaution is confirmed by the operator in the step S29.

(Operation of Gateway Function Controller 203)

Figure 8:
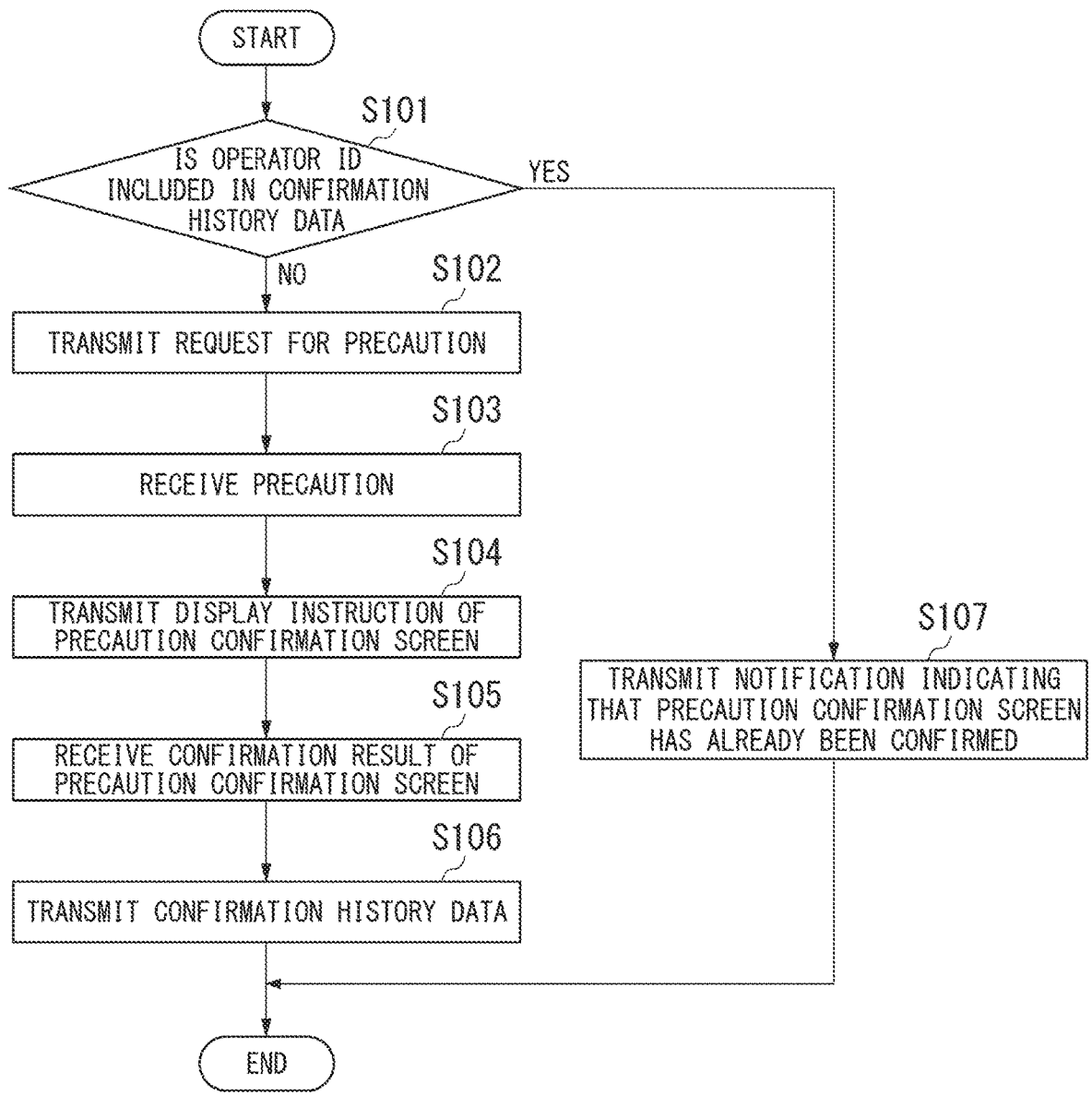
FIG. 8 is a flowchart showing an operation of a gateway function controller according to the first embodiment.

Here, a procedure for determining whether or not to omit the display of the precaution by the gateway function controller 203 in the process of steps S24 to S30 described above will be described. FIG. 8 is a flowchart showing the operation of the gateway function controller 203 according to the first embodiment.

The gateway function controller 203 determines whether or not the operator ID indicated by the authentication result received from the monitor controller 204 is included in the confirmation history data received from the server device 500 in advance (step S101). In a case where the operator ID indicated by the authentication result is not included in the confirmation history data (NO in step S101), the gateway function controller 203 transmits a request for a precaution to a component connected via the second internal network N2 (step S102). Accordingly, the gateway function controller 203 receives information indicating the precaution from the component having the precaution (step S103). Next, the gateway function controller 203 generates the precaution confirmation screen D13, and transmits the display instruction of the precaution confirmation screen D13 to the monitor controller 204 (step S104).

Thereafter, when receiving from the monitor controller 204 the information indicating that the precaution confirmation screen D13 is confirmed (step S105), the gateway function controller 203 generates confirmation history data including the operator ID indicated by the authentication result. Then, the gateway function controller 203 transmits the generated confirmation history data to the server device 500 via the wide area communication controller 207 (step S106). The wide area communication controller 207 may transmit the confirmation history data to the server device 500 immediately after the reception, or may buffer the confirmation history data in an internal memory and transmit the confirmation history data to the server device 500 at a predetermined time.

On the other hand, in a case where the authenticated operator ID is included in the confirmation history data in step S101 (YES in step S101), the gateway function controller 203 transmits a notification indicating that the precaution confirmation screen D13 has already been confirmed to the starter signal unit 202 via the first internal network N1 (step S107).

(Actions and Effects)

As described above, according to the first embodiment, the control system 145 receives, from the server device 500, the confirmation history information indicating an operator who has confirmed the precaution related to the additional function, and determines whether or not to omit the presentation of the precaution for the operator based on the confirmation history information. Accordingly, it is possible to omit the display of the precaution for an operator who has confirmed the precaution related to the additional function.

Other Embodiments

The embodiments have been described above in detail with reference to the drawings; however, the specific configurations are not limited to the above-described configurations, and various design changes or the like can be made. That is, in another embodiment, the order of the above-described processes may be appropriately changed. In addition, some of the processes may be executed in parallel.

The starter signal unit 202 according to the above-described embodiment may be configured by a single computer, or may be configured such that a configuration of the starter signal unit 202 is divided and disposed in a plurality of computers and the plurality of computers cooperate with each other to function as the starter signal unit 202. For example, in the starter signal unit 202, a function of outputting the activation signal and a function of performing authentication of the operator may be implemented in separate computers. Some of the computers constituting the starter signal unit 202 may be mounted inside the work machine 100 and other computers may be provided outside the work machine 100.

In the control system 145 according to the above-described embodiment, some of the configurations constituting the control system 145 may be mounted inside the work machine 100, and other configurations may be provided outside the work machine 100.

The operator terminal 300 according to the above-described embodiment is a terminal such as a smartphone that can execute an application program, but is not limited thereto. For example, the operator terminal 300 according to another embodiment may be a key fob having only a function of outputting a predetermined advertising packet. In a case where the operator terminal 300 is a key fob, the application program cannot receive the selection of the work machine 100 to be activated. In this case, among the work machines 100 that have received the advertising packet, all the work machines 100 that have been paired with the operator terminal 300 which is the transmission source of the advertising packet may be activated.

The work machine 100 according to the above-described embodiment has, as an additional function, a collision prevention function of detecting an obstacle in the periphery of the work machine 100 and limiting the operations of the undercarriage 110, the swing body 120, and the work equipment 130 based on a detection result, but is not limited thereto. For example, the additional function according to another embodiment may be another safety function such as displaying a detection result of an obstacle on the touch panel 145D and outputting a voice as an alarm. In addition, for example, an additional function according to another embodiment may be a function of automatically controlling the work equipment 130 such that the bucket 133 does not intrude below a preset construction surface.

The work machine 100 according to the above-described embodiment recognizes that the setting of the operation lever and the precautions are confirmed by the input to the touch panel 145D, but is not limited thereto. For example, the work machine 100 according to another embodiment may have a voice recognition function, output the setting of the operation lever and the precaution by a voice instead of the display on the touch panel 145D, and determine whether or not the setting of the operation lever and the precaution have been confirmed by voice recognition.

The gateway function controller 203 according to the above-described embodiment determines whether or not to omit the precaution confirmation screen D13 of the additional function, but is not limited thereto. For example, the gateway function controller 203 according to another embodiment may further determine whether or not to omit the operation setting confirmation screen D12 for confirming the operation setting content. In this case, the confirmation history data of the server device 500 stores a caution flag indicating whether or not the precaution related to the additional function is confirmed and a setting flag indicating whether or not the operation setting is confirmed in association with the operator ID. In this case, the gateway function controller 203 determines whether or not the precaution confirmation screen D13 can be omitted based on true or false of the caution flag associated with the operator ID, and determines whether or not the operation setting confirmation screen D12 can be omitted based on true or false of the setting flag. Accordingly, for example, when an operator who boards the work machine having no additional function in the past and has confirmed the operation setting confirmation screen D12 boards the work machine having an additional function, the display of the operation setting confirmation screen D12 is omitted, and the precaution confirmation screen D13 is displayed without being omitted. Accordingly, the operator can omit confirmation not only of the precaution of the additional function but also of the operation setting.

In the gateway function controller 203 according to the above-described embodiment, in a case where the operator has confirmed the precaution of the additional function even once, the precaution confirmation screen D13 is omitted, but the present disclosure is not limited thereto.

For example, the gateway function controller 203 according to another embodiment may present the precaution again when a certain period of time has elapsed since the operator last confirmed the precaution. The confirmation history data according to another embodiment is data in which the operator ID and confirmation date and time are associated with each other, and the gateway function controller 203 may determine omission of the precaution confirmation screen D13 in a case where the current time is within a certain period of time from the date and time associated with the operator ID in the confirmation history data.

In addition, for example, the gateway function controller 203 according to another embodiment may present the precaution again when the display is omitted for a certain number of times (for example, five times) since the operator last confirmed the precaution. The confirmation history data according to another embodiment is data in which the operator ID and the number of omissions are associated with each other, and the gateway function controller 203 may transmit to the server device 500 confirmation history data with the number of omissions, which is added each time the omission of the precaution confirmation screen D13 is determined, and display the precaution confirmation screen D13 when the number of omissions becomes a multiple of a certain number.

In addition, for example, the gateway function controller 203 according to another embodiment may display the precaution confirmation screen D13 in a case where an additional function is added due to a software update, in a case where an additional function is updated, in a case where an additional function becomes available due to the addition of a new component, or the like since the operator last confirmed the precaution.

The gateway function controller 203 according to the above-described embodiment omits the precaution confirmation screen D13 when the operator confirms the precaution of the additional function in any of the work machines 100, regardless of a model of the work machine 100, but is not limited thereto. For example, the gateway function controller 203 according to another embodiment may determine whether or not to omit the display of the precaution confirmation screen D13 for each model of the work machine 100. The confirmation history data according to another embodiment may be data in which the model of the work machine 100 and the operator ID who has confirmed the precaution in the work machine 100 related to the model are associated with each other. The gateway function controller 203 determines whether or not a combination of the authenticated operator ID and the model of the work machine 100 is included in the confirmation history data, and may determine the omission of the precaution confirmation screen D13 in a case where the precaution in the same model of the work machine 100 is confirmed. For example, even when the operator boards a hydraulic excavator after confirming the precaution confirmation screen D13 in a bulldozer, the precaution confirmation screen D13 is displayed without being omitted.

The work machine 100 according to the above-described embodiment is a hydraulic excavator, but is not limited thereto in another embodiment. For example, the work machine 100 according to another embodiment may be another work machine such as a dump truck, a wheel loader, or a motor grader.

(Computer Configuration)

Figure 9:
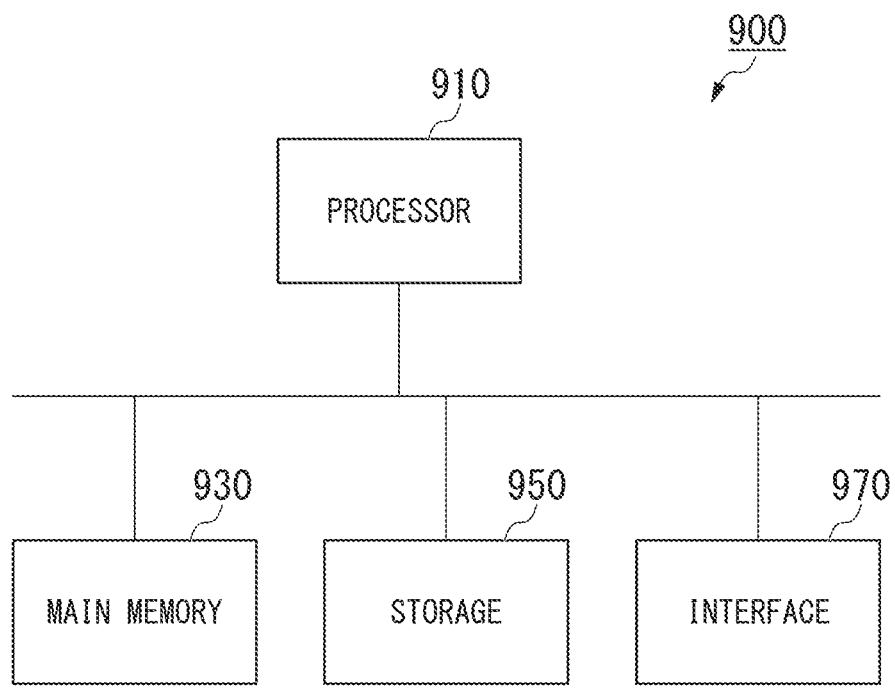
FIG. 9 is a schematic block diagram showing a configuration of a computer according to at least one of the embodiments.

FIG. 9 is a schematic block diagram showing a configuration of a computer according to at least one of the embodiments.

Each device (the starter signal unit 202, the gateway function controller 203, the monitor controller 204, the control controller 205, or the like) included in the control system 145 described above is implemented on a computer 900. The computer 900 includes a processor 910, a main memory 930, a storage 950, and an interface 970. The operation of each processing unit described above is stored in the storage 950 in the form of a program. The processor 910 reads the program from the storage 950, deploys the program to the main memory 930, and executes the process according to the program. In addition, the processor 910 secures a storage region corresponding to each of storage units described above in the main memory 930 according to the program. Examples of the processor 910 include a central processing unit (CPU), a graphic processing unit (GPU), and a microprocessor.

The program may be used for realizing some of functions of the computer 900. For example, the program may function in combination with another program already stored in the storage or in combination with another program implemented in another device. In another embodiment, the computer 900 may include a custom large scale integrated circuit (LSI), such as a programmable logic device (PLD), in addition to or instead of the configuration described above. Examples of the PLD include a programmable array logic (PAL), a generic array logic (GAL), a complex programmable logic device (CPLD), and a field programmable gate array (FPGA). In this case, some or all of the functions realized by the processor 910 may be realized by the integrated circuit. Such an integrated circuit is also included as an example of the processor.

Examples of the storage 950 include a magnetic disk, a magneto-optical disk, an optical disk, and a semiconductor memory. The storage 950 may be an internal medium directly connected to a bus of the computer 900, or may be an external medium connected to the computer 900 via the interface 970 or a communication line. In addition, in a case where this program is delivered to the computer 900 through a communication line, the computer 900 that has received the delivered program may deploy the program to the main memory 930 and execute the above process. In at least one embodiment, the storage 950 is a non-transitory tangible storage medium.

In addition, the program may be for realizing some of the above-described functions. Furthermore, the program may be a so-called difference file (difference program) that realizes the above-described function in combination with other programs already stored in the storage 950.

According to the above aspect, for an operator who has confirmed a precaution related to an additional function, it is possible to omit a display of the precaution.

The invention claimed is:

1. An activation system for a work machine including a power source, the activation system comprising:
   a processor configured to:
     receive confirmation history information indicating an operator who has confirmed a precaution related to a predetermined additional function included in the work machine, from a server device; and
     control to display the precaution on a monitor in a case in which an operator who operates the work machine is not included in the received confirmation history information, and not to display the precaution on the monitor in a case in which an operator who operates the work machine is included in the received confirmation history information.

2. The activation system for a work machine according to claim 1, wherein
   the additional function includes a function of detecting an obstacle in a periphery of the work machine using an imaging device provided in the work machine.

3. The activation system for a work machine according to claim 2, wherein
   the additional function includes a function of controlling an output of an actuator driven by the power source based on a detection result of the obstacle.

4. The activation system for a work machine according to claim 1, wherein the processor is further configured to
   authenticate an operator who operates the work machine, and
   determine not to display the precaution on the monitor in a case in which the authenticated operator is included in the confirmation history information.

5. The activation system for a work machine according to claim 4, wherein the processor is further configured to
   in a case in which the authenticated operator is not included in the confirmation history information, transmit confirmation history information indicating the authenticated operator to the server device after the precaution is confirmed by the authenticated operator.

6. The activation system for a work machine according to claim 5, wherein the processor is further configured to
   receive the confirmation history information from the server device before authentication of the operator, and transmit the confirmation history information indicating the operator to the server device after the operator is authenticated.

7. The activation system for a work machine according to claim 1, wherein
   the work machine includes work equipment, and
   the processor is further configured to
     present setting information for an operation of the work equipment in addition to the precaution, and
     determine whether or not to display the precaution and the setting information on the monitor based on the confirmation history information.

8. The activation system for a work machine according to claim 1, wherein
   a display of the precaution on the monitor includes information indicating that an operation of the work machine is limited.

9. The activation system for a work machine according to claim 1, wherein
   a display of the precaution on the monitor includes text information.

10. The activation system for a work machine according to claim 9, wherein
    a display of the precaution on the monitor includes a mark.

11. The activation system for a work machine according to claim 1, further comprising
    a confirm button for indicating an intention that the precaution has been confirmed.

12. The activation system for a work machine according to claim 11, wherein
    the confirm button is displayed on the monitor.

13. The activation system for a work machine according to claim 1, wherein the processor is further configured to
    in a case in which an operator who operates the work machine is not included in the confirmation history information, after the precaution is confirmed by the operator who operates the work machine, transmit confirmation history information indicating that the precaution is confirmed to the server device.

14. The activation system for a work machine according to claim 1, wherein the processor is further configured to
    control the work machine to enter an operable state in a case of controlling not to display the precaution on the monitor.

15. An activation method for a work machine including a power source, the activation method comprising using a processor to:
    receive confirmation history information indicating an operator who has confirmed a precaution related to a predetermined additional function included in the work machine, from a server device; and
    control to display the precaution on a monitor in a case in which an operator who operates the work machine is not included in the received confirmation history information, and not to display the precaution on the monitor in a case in which an operator who operates the work machine is included in the received confirmation history information.

16. The activation method for a work machine according to claim 15, further comprising
    controlling the work machine to enter an operable state in a case of controlling not to display the precaution on the monitor.

17. A work machine comprising:
    a power source;
    work equipment driven by the power source;

an operation lever configured to operate the work equipment;

a monitor; and a processor configured to:

realize a predetermined additional function;

receive confirmation history information indicating an operator who has confirmed a precaution related to the predetermined additional function from a server device; and control to display the precaution on a monitor in a case in which an operator who operates the work machine is not included in the received confirmation history information, and not to display the precaution on the monitor in a case in which an operator who operates the work machine is included in the received confirmation history information.

18. The work machine according to claim 17, wherein the processor is further configured to control the work machine to enter an operable state in a case of controlling not to display the precaution on the monitor.

\* \* \* \* \*